US008612267B1

(12) United States Patent  (10) Patent No.: US 8,612,267 B1
Shrivastava  (45) Date of Patent: *Dec. 17, 2013

(54) METHOD OF ESTIMATING AND OBTAINING INTERNATIONAL HEALTH AND TEMPORARY MEDICAL INSURANCE

(71) Applicant: Maxn Systems, Inc., Sunnyvale, CA (US)

(72) Inventor: Rajeev Shrivastava, Santa Clara, CA (US)

(73) Assignee: Maxn Systems, Inc., Sunnyvale, CA (US)

( * ) Notice: Subject to any disclaimer, the term of this patent is extended or adjusted under 35 U.S.C. 154(b) by 175 days.

This patent is subject to a terminal disclaimer.

(21) Appl. No.: 13/627,166

(22) Filed: Sep. 26, 2012

Related U.S. Application Data

(63) Continuation-in-part of application No. 12/767,042, filed on Apr. 26, 2010, now Pat. No. 8,306,832.

(60) Provisional application No. 61/226,962, filed on Jul. 20, 2009.

(51) Int. Cl.
*G06Q 40/00* (2012.01)
(52) U.S. Cl.
USPC .............................. 705/4; 705/35
(58) Field of Classification Search
USPC ............................................... 705/4
See application file for complete search history.

(56) References Cited

U.S. PATENT DOCUMENTS

| | | | | |
|---|---|---|---|---|
| 2002/0055862 A1* | 5/2002 | Jinks | | 705/4 |
| 2002/0147617 A1* | 10/2002 | Schoenbaum et al. | | 705/4 |
| 2004/0039610 A1* | 2/2004 | Weitermann et al. | | 705/4 |
| 2006/0248008 A1* | 11/2006 | Lind | | 705/40 |
| 2008/0109378 A1* | 5/2008 | Papadimitriou | | 705/36 R |
| 2008/0177566 A1* | 7/2008 | Karamchedu et al. | | 705/2 |
| 2009/0132301 A1* | 5/2009 | Weitermann et al. | | 705/4 |
| 2009/0164256 A1* | 6/2009 | Fisher et al. | | 705/4 |
| 2009/0276247 A1* | 11/2009 | Howell | | 705/4 |
| 2009/0299822 A1* | 12/2009 | Harari et al. | | 705/10 |

* cited by examiner

*Primary Examiner* — Sarah Monfeldt
*Assistant Examiner* — Kevin Poe
(74) *Attorney, Agent, or Firm* — Stephen E. Zweig

(57) ABSTRACT

A computerized method of allowing insurance customers to purchase travel medical insurance or other foreign medical insurance, based on user age, sex, and various user designed risk scenarios, and receive information on the payout amounts that various insurance plans will deliver based upon these factors. In one embodiment, a method for allowing customers who are unfamiliar with the medical cost structure of a foreign country to be informed both as to the costs of medical treatment in that country, and the benefits that a variety of foreign coverage medical insurance plans will provide under these user risk scenarios. These plans may then be evaluated according to different user selected parameters. The method can be implemented using computerized servers and client devices communicating using standard internet protocols over the internet.

22 Claims, 9 Drawing Sheets

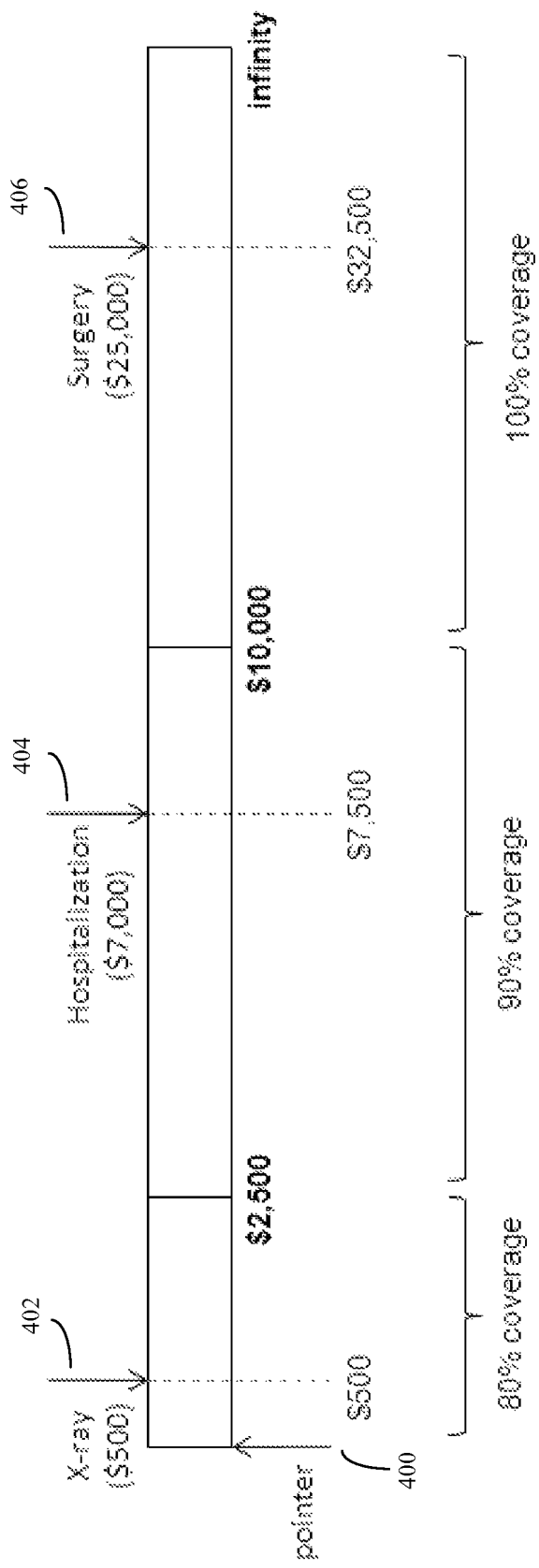

Figure 5

Visitor Insurance > Quotes & Compare Best Visitor Insurance USA Plans

Visitor Insurance Quote and Compare

Provide the following information about the Visitors to get Best Quotes — 500

Nationality: Non US Citizen ▼

Coverage Area: USA Only ▼ — 502

Applicant Age: 50-59 ▼  Years Or  Enter as Date of Birth — 504

Does Spouse Need Coverage? ○ Yes ○ No — 506

Do Dependent Children Need Coverage? ○ Yes ○ No — 508

Coverage Period:
Start Date: Apr ▼ 19 ▼ 2010 ▼
End Date: May ▼ 18 ▼ 2010 ▼
— 510

[Get Quotes]

Figure 6

STEP 1 — SELECT MEDICAL SITUATIONS
STEP 2 — ESTIMATE MEDICAL COSTS
STEP 3 — COMPARE POLICY BENEFITS

Step 1: Select Medical Situations

Select one or more medical situations that you might run into, from the following:
We will use this information to estimate and compare different visitor insurance policies for you.

Please select at least one medical situation!

Simple Medical Situation
(less expensive, e.g. flu etc.)

- ☑ Doctor's visit / consultation
- ☑ Lab Tests / X-ray
- ☑ Prescription drugs

Help

Complex Medical Situation
(more expensive, e.g. accident, surgery)

- ☑ Hospital Room
- ☑ Surgery
- ☑ Intensive Care
- ☑ Ambulance

Help

Please select visitor's age!

What is the visitor's age? * [30-39 ▼]

Note: For age 80 and above, many coverage restrictions apply. Please call 1-866-384-9104 to talk to a licensed insurance agent.

[ Next ▶ ]

Figure 7

Step 2: Estimate Medical Costs

Edit Medical Situations ▼

Following is an estimate of your medical cost based on the selections you made above. You can adjust the and number of times you expect to use each service, and get a revised estimate. See an example

| Services Used | Frequency/Cost | Average Cost * | Estimated Hospital Bill |
|---|---|---|---|
| Doctor's visit / consultation | 2 visits ▼ | $75 per visit ❷ | $150 |
| Lab Tests / X-ray | 3 tests ▼ | $100 per test ❷ | $300 |
| Prescription drugs | $100 ▼ | $100 ❷ | $100 |
| Hospital Room | 2 days ▼ | $3,000 per day ❷ | $6,000 |

SELECT MEDICAL SITUATIONS | ESTIMATE MEDICAL COSTS | COMPARE POLICY BENEFITS

Figure 9

| Insurance Plan | Insurance Pays ? | Your Responsibility ?<br>(excludes deductible) |
|---|---|---|
| Atlas America<br>(In-Network, Direct Billing ONLY)<br>Atlas America<br>In-Network "If Direct Billing" Co-insurance waived. | $27,030.00<br>☐ See breakup | $20.00<br>☐ See breakup |

900

| Medical Services | Hospital Bill | Insurance Pays | Your Responsibility |
|---|---|---|---|
| Doctor's visit / consultation | $150.00 | $150.00 | $0.00 |
| Lab Tests / X-ray | $300.00 | $300.00 | $0.00 |
| Prescription drugs | $100.00 | $80.00 | $20.00 |
| Hospital Room | $6,000.00 | $6,000.00 | $0.00 |
| Surgery | $15,000.00 | $15,000.00 | $0.00 |
| Intensive Care | $4,000.00 | $4,000.00 | $0.00 |
| Ambulance | $1,500.00 | $1,500.00 | $0.00 |
| Total | $27,050.00 | $27,030.00 | $20.00 |

These are hypothetical numbers only. Please review plan brochure for complete details.

METHOD OF ESTIMATING AND OBTAINING INTERNATIONAL HEALTH AND TEMPORARY MEDICAL INSURANCE

CROSS REFERENCE TO RELATED APPLICATIONS

This application is a continuation in part of U.S. patent application Ser. No. 12/767,042, "Insurance Benefits Estimator", Inventors Rajeev Shrivastava and Amit Goel, Apr. 26, 2010; application Ser. No. 12/767,042 in turn claimed the priority benefit of provisional application No. 61/226,962 "Insurance Benefits Estimator—this tool enables a consumer to create hypothetical medical situations and simulate the "out of pocket" expenses incurred by the consumers for each situation if different insurance policies were to be purchased", filed on Jul. 20, 2009, Rajeev Shrivastava Inventor.

BACKGROUND OF THE INVENTION

1. Field of the Invention

The invention is in the field of computerized networked insurance methods, with a specific emphasis on travel or foreign stay insurance, travel or foreign stay medical insurance and health insurance.

2. Description of the Related Art

Insurance policies usually provide various types of coverage benefits (e.g. hospitalization benefits, ambulance benefits, emergency care benefits). Although prior art computerized systems exist whereby a consumer (user) may use a web browser to access a server and purchase insurance, these prior art systems do not provide enough comparative information and ability to construct alternative scenarios to enable a consumer or user to make a fully informed purchasing decision.

Thus at present, a consumer might purchase an insurance policy with a low premium without clearly understanding the various types of coverage benefits provided by the insurance policy, and the costs the consumer might incur when it is time to file a claim.

As a result, the consumer might end up paying a higher cost at the time of filing a claim. Alternatively, the consumer may purchase more insurance than is likely to be needed under most realistic scenarios, and end up spending more as a result. Both outcomes are unsatisfactory.

These problems are particularly acute when the consumer wishes to purchase insurance, such as health insurance, in a country other than that of the consumer's country of origin (usually the country of the consumer's citizenship). This is because consumers accustomed to the price structures in their country of origin may be quite unfamiliar with the very differing price structures in other countries, and thus may either under purchase insurance (e.g. not purchase sufficient medical insurance) or alternatively waste money by purchasing much more coverage than is actually needed.

Previous work in the insurance industry, here using medical/health insurance as a particular example, tended to ignore the problems resulting from purchasing medical insurance while traveling between or residing in foreign countries. This prior art, which was generally entirely one country based, includes Howell, US patent publication 2009/0276247 entitled "Systems and methods for web-based group insurance/benefits procurement and/or administration". Other prior art with this type of single country focus includes Jinks, US patent publication 2002/0055862, entitled "Systems and methods for interactively evaluating a commercial insurance risk"; and Lind, US patent publication 2006/0248008, entitled "Method of evaluating a benefit plan".

BRIEF SUMMARY OF THE INVENTION

The invention is based, in part, on the insight that consumers highly value an ability to understand if the insurance plan that they are contemplating purchasing is able to cope with a variety of foreseeable scenarios. This invention is also based, in part, on the insight that travelers or other persons migrating to other countries (i.e. that are foreign to them) have a particularly acute need for this alternate scenario capability because these individuals will generally be unaccustomed to the relative expenses to that particular foreign country. The invention is also based, in part, on the insight that this problem becomes even more acute when the consumer is purchasing medical insurance in countries other than the consumer's home country (usually country of citizenship) because consumers are usually unaware of both medical costs in general, and how such medical costs can widely differ on a country-by-country basis.

The present invention thus embodies a computerized networked system and method that, for example, enables a consumer to create hypothetical medical situations and simulate the "out-of-pocket" expenses incurred by the consumer for each situation if different insurance policies were to be purchased. In one embodiment, the invention is a method of operating a database of insurance information that may reside on a server, and may be accessed by various customers over a network such as the internet, using various types of clients like web browsers, other internet enabled apps, smart phones, handheld devices, and the like. In another embodiment, the invention is a method of making comparisons between different medical insurance plans over a network, which may be the internet, or may be an alternative type of network such as the phone system, or a private network.

The invention assists a consumer in the decision-making process while the consumer is shopping for insurance. It does so by letting the consumer specify certain desired coverage benefits before purchasing insurance. The invention then evaluates the various coverage benefits offered by a plurality of insurance policies, and reports to the consumer a list of possible insurance policies that meet the coverage benefits desired by the consumer, along with the "out-of-pocket" expenses the consumer can expect to incur with each policy.

Although this method may be used for a wide variety of different types of insurance plans, it is particularly advantageous for foreign medical insurance, (e.g. travel health insurance, international health insurance), and other types of health insurance. It is particularly useful for purchasing travel medical insurance or international health insurance in situations where an individual may wish to travel to a foreign country or otherwise reside for a period of time in a country other than his country of origin. This is because medical expenses can vary greatly from country to country, and an individual wishing to purchase travel medical/health insurance or international medical/health insurance for a travel or other stay to a foreign country, regardless of travel duration, will be at a disadvantage because he or she will be uninformed as to the true cost of various types of medical coverage in the foreign country. Thus in order to make informed decisions, this individual should ideally make medical insurance purchases that are not based upon simple benefit amounts, but rather are based on an appreciation of what the particular benefit amounts actually mean in terms of covering various medical expenses under various scenarios in the foreign country.

Thus in one embodiment, the invention is a method of making comparisons between different varieties of different medical insurance plans over a network. In a preferred embodiment, these different medical insurance plans will be different travel or foreign stay medical insurance plans of various durations (e.g. short term, medium term, long term duration).

The invention will be typically implemented in the form of software that controls the operation of servers and one or more databases. To implement the invention, one or more database administrators will usually set up a database comprising various types of information pertaining to medical insurance plans.

For example, the database administrator(s) will typically enter information on the cost parameters and reimbursement parameters associated with a variety of different medical insurance plans into a computer database. The system administrator(s) will also often set up a user input form, which will often be in the form of at least one web page or script that is sent from a network server to the user, often over a network such as the internet, and often in the form of at least one web page that will be displayed on a client device (client) (e.g. a computer, computerized cell phone, etc.) that is usually local to the client.

Note, however, that in an alternative embodiment, if the system is designed to, for example, operate over the telephone, the user input form could be presented as a series of audio cues such as "press 7 if you want to request additional coverage for your spouse", and the system could alternatively respond to vocal commands or telephone keypad presses. As yet another embodiment, the user may interact with a mobile app, such as a smartphone app or tablet app, which has been customized to work with smaller size touch sensitive display screens. For simplicity however, most of the examples in this specification will be examples where the form or forms are one or more web pages that are being read on a web browser on the user's client device, and where the user in turn is entering data into the various web pages in the form of mouse clicks, keyboard entries, or touches on a touch sensitive display screen.

The user input form will ideally be capable of capturing a variety of different user medical parameters, as well as a variety of different user medical scenarios. The data from this form will then be transmitted from the client (e.g. client device such as a web browser or other network connected app) to the originating server or alternative destination as appropriate. Once this data is received, various algorithms, which will be described in more detail in the following sections, will analyze the user data from the form using the database of various types of medical insurance plan information. Often the results of this computerized analysis will then be used to produce a ranked comparison of the benefits. Additionally, often the invention will provide the costs of the plans as well. Often this analysis will also have further breakdowns of results as a function of the various user medical parameters and user scenario parameters. Typically the results of this analysis will be formatted by this system into one or more appropriate web pages, and then sent to the user's client system where the results may then be viewed and analyzed by the user. Alternatively the results may be conveyed back to a mobile app, or even relayed back by audio information over an audio connection.

BRIEF DESCRIPTION OF THE DRAWINGS

FIG. 4 shows an example of the coverage policies of a typical travel insurance plan.

FIG. 5 shows an example of a user input form, here running in the web browser of a client, which can capture both some of the user travel parameters and some of the user's medical parameters.

FIG. 6 shows an example of a user input form, again here running on the web browser of a client, which can start to capture some of the various medical scenario parameters.

FIG. 7 shows an example of a user input form, again here running on the web browser of a client, which can capture additional information on the various medical parameters.

FIG. 9 shows an example of a more detailed breakdown result of the reimbursement benefit provided by a specific medical insurance plan, which has been transmitted to the client computer and is now being viewed by the user in a web browser of a client.

DETAILED DESCRIPTION OF THE INVENTION

Figure 1:
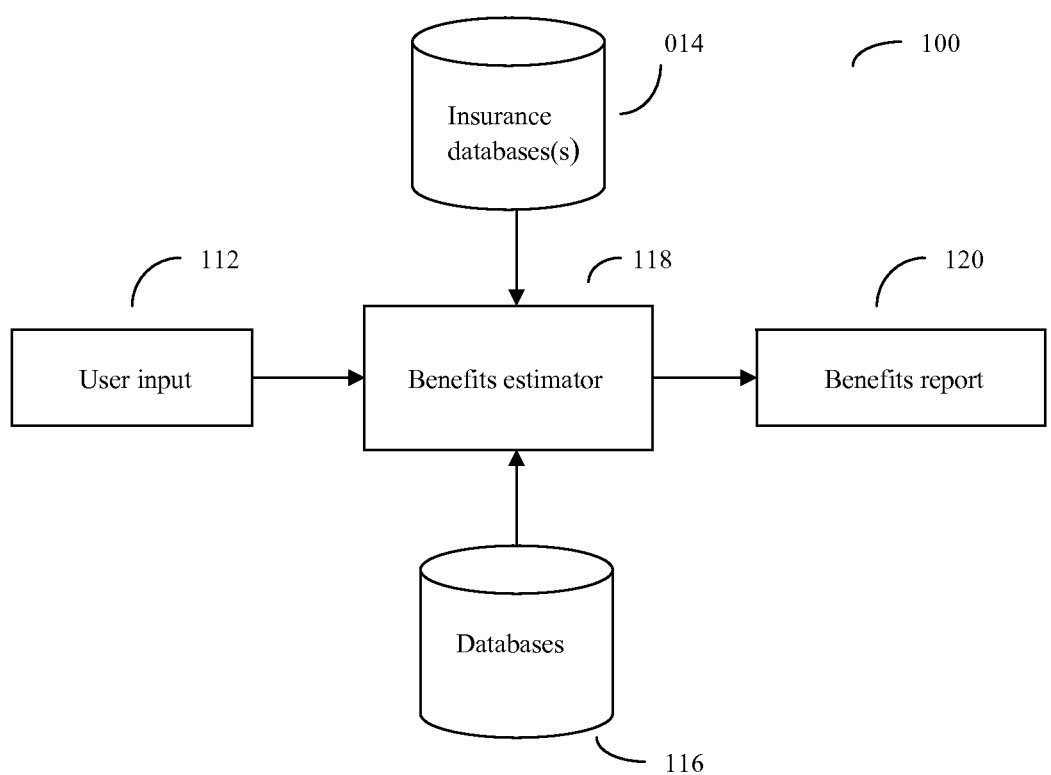
FIG. 1 shows an overview showing how the user input data may be combined with insurance database data to produce a benefits report.

Nomenclature: In the health insurance industry, health insurance purchasers who intend to travel out of their country of origin (usually their country of citizenship) can be purchased according to different types of plans. When the purchaser is contemplating a short duration trip (e.g. days or months), and is less interested in having the option to renew the insurance after that short duration trip, then the travel health insurance product is often sold as "travel health insurance". By contrast, when the purchaser is contemplating a medium duration trip, stay, or other absence from their country of origin of months or years, and/or is interested in the possibility of being able to easily renew their insurance coverage, then the travel health insurance product is often sold under the name "international health insurance". There, instead of specifying a trip start date and end date, as is often the case with short duration travel, the user instead will specify their country of origin (again usually citizenship), the desired coverage start date (often but not always starting from the date of departure from the country of origin), and instead of specifying a firm end date, the user may instead purchase a number of months of coverage. To encourage longer duration purchases, "international health insurance" plans may require that the user purchase a minimum of two months (e.g. first and last month), and even commit to a year's worth of monthly purchases, and may forfeit their last month's payment if the user cancels early. Nonetheless, there is a considerable amount of overlap between the two types of "non-country of origin" health insurance, and in this disclosure, unless otherwise specified, the term "travel health insurance" is intended to cover both short duration (e.g. days to months) "travel health insurance" as well as longer duration (e.g. months or multiple months) "international health insurance" as well.

The present invention embodies a system and method that enables a consumer to create hypothetical medical situations and simulate the "out-of-pocket" expenses incurred by the consumer for each situation if different insurance policies were to be purchased. As previously described, the invention will typically be implemented in the form of software that resides on a network server and database. This specification may be viewed as a functional description of the various software modules that implement the invention.

In one embodiment, the invention is designed to assist travelers to foreign countries purchase an appropriate amount of travel medical insurance. The system allows the users to make informed decisions as to how much coverage to purchase by allowing users to enter data pertaining to their respective medical status, and various hypothetical medical need scenarios, and make informed judgments as to how much insurance to purchase based upon these various scenarios. The system and method will inform the customers about the tradeoffs between more extensive coverage and insurance premiums.

The invention assists a consumer, while the consumer is shopping for insurance (often over the internet using a web browser, internet enabled tablet or smartphone "app", or other internet connected client software) in the decision-making process. The invention lets the consumer specify certain desired coverage benefits. The invention then evaluates the various coverage benefits offered by a plurality of insurance policies, and reports to the consumer a list of possible insurance policies that meet the coverage benefits desired by the consumer, along with the "out-of-pocket" expenses the consumer can expect to incur with each policy.

For example, a young and healthy consumer may want more coverage for minor ailments like flu, skin rashes, etc, and may be willing to take the risk of having less coverage for more complex medical issues like hospitalization, surgery, ambulance, etc. In this case, the consumer might want an insurance policy that is suited for minor ailments only. In one embodiment, a consumer knowledgeable about local medical expenses can then himself enter the estimated costs that the consumer is willing to pay for various services that may be required when the consumer visits a hospital. For example, the consumer might specify the amount he/she is willing to pay for doctor consultation, lab tests, prescription drugs, etc. More typically, the consumer will not be fully knowledgeable about the costs of local medical expenses, and here the invention may assist the customer by providing this information.

In other cases, the consumer may wish to provide for more major problems, such as the costs of pregnancy, emergency dental work, major accidents, major illness (and the drugs associated with these problems) and the like, yet still desire to minimize costs. In this case, the customer may want an insurance policy that is capable of handling at least the majority of these more substantial problems. However this customer will still need assistance in determining, for example, what the statistically likely costs would be to treat these more substantial problems, at least at various probability levels such as the 75%, 90%, 95% levels in a particular foreign country of interest.

The invention may operate by providing suitable web page forms to the customer's web browser or other internet client (e.g. a Smartphone app), working with the customer's client computer system (client, client device—e.g. personal computer, cell phone, smartphone, computerized pad, PDA, and the like) to accept the input, and then returning the input data back to a server and database which contains the relevant information and benefit and comparison algorithms (here these algorithms are occasionally referred to in the alternative as a "benefits wizard"). Once the data (input) is returned, the invention will process the input supplied by the consumer and report to the consumer a list of possible insurance policies that provide benefits based on the coverage selected by the consumer, along with other optional options, such as options to purchase, options for additional information, options to put in a shopping cart, etc.

The list of possible insurance policies may display details or links to details on how much each insurance policy will pay, and how much the consumer will have to pay out of pocket. In this way, the consumer will be able to quickly evaluate many insurance policies, will be able to identify an insurance policy that satisfies the consumer's needs more closely, and will be able to purchase the right insurance directly from the report. While filing a claim, the consumer will also be both more informed and confident of the various benefits offered by the insurance policy.

For example, consider the situation of a visitor from India making a trip to the United States for the first time, or otherwise planning on staying in the US for a period of time. Indian medical costs are much lower than US medical costs. As a result, the visitor may have little idea about what various American medical supplies and procedures cost, and thus may be at high risk for purchasing an inappropriate amount (often too small an amount) of travel medical insurance. This visitor may thus be at high risk of insufficient coverage if an accident or medical emergency happens to him or her while visiting the US. The invention will provide the Indian visitor with sufficient information to avoid this problem.

Consider the opposite situation in which a visitor from the US is traveling to India or staying in India for a period of time. Here the US visitor will be unlikely to be familiar with the various Indian travel medical insurance plans, and will also likely be unfamiliar with the costs of medical treatment in India, which are often considerably lower than comparable costs in the US. As a result, the US visitor is at risk of substantially overpaying for a deluxe travel medical insurance plan or international health insurance plan that far exceeds any likely medical contingency while traveling in India. The invention will provide the US visitor with sufficient information to avoid this problem as well.

Although the examples of travel or foreign stays to and from India and the US are cited as specific examples in this specification, it should be evident that the same principles apply to travel, stays, or other visits between any two countries, as well as regions within a country. In general, if given sufficient information on various travel medical insurance policies, and optionally information on local charges for various medical services and products, the system can operate on a worldwide basis, and can be a central clearing house for travelers or other visitors between any and all permutations of various countries and country regions.

Thus in general, the invention may store information pertaining to a wide variety of different travel health/medical insurance plans and international health/medical insurance plans from a wide variety of different countries and also regions within a country. On more complex scenarios in which the individual or group of individuals intend to travel to multiple countries, the system may also allow the individuals to enter a similar set of medical scenarios, and then select the various different countries that they intend to visit. The invention may take this information, consult its various databases, and suggest a variety of different travel medical/health insurance plans and international health/medical insurance plans that best fit the individuals or groups particular medical profile and risk scenario for some or all of the various countries that they intend to visit.

As previously discussed, the invention exists in the form of various different software modules, which often may run on different processors on different computer systems, including computer database systems, web server systems, and client computer systems, often connected by a network such as the internet.

More specifically, as previously discussed the invention which will often be implemented in the form of software that controls the operation of servers and one or more databases. To review, the invention typically requires an administrator to set up a database comprising various types of information pertaining to various medical insurance plans. In this method the administrator of the database will typically enter information on the cost parameters and reimbursement parameters associated with a variety of different medical insurance plans into a computer database. This database in turn is connected to a computer server, which in turn is connected to a network, which may be the internet, or alternative form of network. This server may be referred to in the alternative and more general form as a "networked server". The administrator may then set up a user input form, which may be in the form of one or more web pages or app pages or scripts that are sent from a network server to the user, often over a network such as the internet, and often in the form of various web pages that will be displayed on a client (e.g. a computer, computerized cell phone, etc.) device that is usually local to the human client (consumer).

The user input form will ideally be capable of capturing a variety of different user medical parameters, as well as a variety of different user medical scenarios. The data from this form will then be transmitted back from the client device to the originating server or alternative destination as appropriate. Once this data is received, various algorithms (the "benefits wizard" or "benefits estimator", which will be described in more detail in the following sections), will analyze the user data from the form versus the database of various types of medical insurance plan information.

Often the results of this computerized analysis will produce a ranked comparison of the benefits, and often the costs as well, provided by the various medical insurance plans. Often this analysis will also have further breakdowns of results as a function of the various user medical parameters and user scenario parameters. Typically the results of this analysis will be formatted by this system into one or more appropriate web pages, and then sent to the user's client system where the results may then be viewed and analyzed by the user.

As previously discussed, often the invention can be used to compare a variety of different insurance plans from country to country. Although throughout this disclosure, the example of travel medical insurance plans and international health/medical insurance plans will be used as one type of example and embodiment of the invention, these examples and embodiments are not intended to be limiting. For example, the same principles may be used for automobile insurance or any other activity where insurance is desired, the user may not be fully informed about the financial risk of various scenarios, and needs an automated expert system to help construct various scenarios in order to make informed decisions about how much coverage to purchase. Similarly the term "travel health insurance" or "travel medical insurance" generally encompasses both short duration travel (usually international travel) as well as and longer duration international travel (e.g. international health insurance). Nonetheless, for simplicity, the travel medical insurance plan or international health insurance plan (for either short duration excursions or longer duration excursions from the client's country of origin) serves as a good illustration of these general principles, and will continue to be used here as a specific embodiment of the invention.

In order to capture information useful to compare travel medical insurance plans from country to country, often the user input form, provided by the server to the user's client computer, will be capable of capturing a variety of different user travel parameters, including the user's itinerary—country of origin, intermediate countries or regions of countries visited, country of destination, or region of travel, length of travel (or alternatively time of travel start or time that coverage is desired, and either a travel end date, or alternatively a purchase of X days, months, or years of coverage from the start date). The various benefits estimator or benefits wizard algorithms may then take this type of data into account when analyzing the various insurance plans.

The user may input parameters responsive to the user's individual risk factors as well. In the case of automobile travel insurance, this could be information pertaining to the user's model of auto, mileage, repair record, which would allow an automobile insurance system to assess the underlying risk of breakdowns. In the case of medical insurance, this information will cover the user's various medical parameters. These medical parameters can include the user's (traveler's) age, sex, and pre-existing medical conditions. Other useful information to collect will include data on the user's spouse who may be traveling with the user, along with information on the spouse's age, sex, and pre-existing medical conditions. Still other useful information will include data on the user's children or dependent children, their ages, sexes, pre-existing conditions and the like.

The various scenario parameters that the user may enter into the form include the user's own estimate of the probabilities of various mishaps or disasters occurring during the insured period, such as while traveling. Alternatively the server may supply actual or recommended statistics on these probabilities. In the case of automobile insurance, this would be scenarios such as automobile breakdown or low speed minor accidents and hotel time while the automobile was repaired. Alternatively the user may wish to insure for more disastrous situations, such as major collisions, fatal collisions, and so on.

In the case of medical insurance, and in particular the various types of travel or foreign stay medical insurance, the corresponding scenario parameters that the user may enter into the form may include parameters such as simple medical situations—e.g. doctor's visits, doctor's consultations, common laboratory tests, standard x-rays, and various common prescription drugs. The user may also wish to consider more complex medical situations, such as hospital room costs, various types of surgery, intensive care stays, urgent care services, emergency services (i.e. emergency room costs), therapy, and anesthesia. Other more complex treatments may include dental treatments, eye treatments, and ambulance costs. Costs associated with pre-existing medical conditions may also be entered into the scenario. For example if one member of the party is pregnant, emergency treatment for childbirth or medical complications of pregnancy may also be part of the scenario.

Even within a country, or even within a region of a country, medical costs are not totally uniform for each situation. Thus even if the database uses highly accurate average costs for the various medical situations, this average cost will only be appropriate for at most about 50% of all of the medical situations of this type. In order to accommodate users who may wish to do more extensive worst-case planning, the software may also contain information related to variation or other deviation or spread in the costs for various situations, and provide users with the option to consider more than just the average costs.

For example, a user might want to be protected against costs for up to one or two or even three standard deviations above normal medical costs. Thus in some embodiments, an additional option to request analysis of above average medical costs may be provided. Since most users are unlikely to be familiar with statistics and standard deviation calculations, the invention's user interface can allow the user to select above average costs by simpler methods, such as specifying that the user wants coverage of typical average costs, or costs that are encountered 90% of the time or less, and so on.

Alternatively, the server may provide one or more previously assigned scenarios, ideally derived from either actual statistics, or educated medical opinion, as to the total costs (e.g. the sum of various hospital stays, treatments, drugs, and the like) associated with certain medical problems in the country of interest, and allow the user to select among these alternatives as well. In still another embodiment, and as previously discussed, these previously assigned scenarios may be assigned various degrees of statistical variance, so that a user could, for example, choose to purchase protection that covers 50%, 75%, 90%, 95%, 99% and so on of the likely medical costs in various previously assigned medical scenarios. Here graphical slider interfaces, and the like, that would allow the user to dial in the desired coverage and get resulting cost information, may be useful.

In order to set up the insurance database, the operator of the database will often wish to enter into the database as much information on the various insurance plans offered as is available or as is possible. For example, for a database of different travel or foreign stay medical insurance plans, the operator or other database administrator will typically enter in information on the various cost parameters and reimbursement parameters of the various insurance plans. The insurance information can additionally be broken down still further into various country specific regions as appropriate.

The database administrator will may optionally create a database of the various medical scenarios and typical costs (and optionally the spread or variance in these costs as well) for the country or country region, and do so for as many different countries and/or country regions as feasible.

Once the user input data is compared to the database of medical scenarios and the database of various insurance plans, the results can then be comparison ranked and ultimately sent to the user's client device for viewing by the user. These comparison results can be ranked in various ways. For example, the results can be ranked according to what percentages of medical costs are covered. Alternatively the results can be ranked according to the plan that gives the highest benefits first. As yet another example, the results can be ranked according to cost, or according to a custom user-entered option.

As previously discussed, often it will be useful to also enable a user to easily purchase a particular insurance plan, often within the context of the plan result ranking. This can be done by providing a "buy" or "request more information on" or "add to shopping cart" or "bookmark" or "add to favorites" button, link, checkbox, radio box, or other indicator that will let the system know that the user is either interested in purchasing that particular insurance plan, or alternatively wishes to select that option as being of particular interest for further analysis later.

Implementation:

The invention's methods can be implemented by a wide variety of different software types which in turn may run under a wide variety of different operating systems. This software may in turn drive a variety of different database management programs, and serve up forms to the remote client system using a variety of different methods.

Most of the examples discussed in this specification, such as the examples given in FIGS. 5 thorough 9, were implemented using the PHP hypertext preprocessor, which is a general purpose scripting language often used to produce dynamic web pages. This PHP software in turn ran under an Apache web server, under control of the Linux operating system. The database software used for these examples was the MySQL database. These examples were run on servers and clients that used x86 type processors.

Although PHP, Apache, Linux and MySQL were used for specific examples, note that the invention in fact is applicable to all forms of communication between a consumer and the system using any form, medium, or technology now known or later developed, including but not limited to, telephone, email, website, software application, web service, and instant messaging.

FIG. 1 depicts a system (100) that illustrates a simplified view of some of the high-level interactions among the various components in the present invention. Here a consumer provides input (112) to the benefits wizard (118). In some embodiments, the consumer may be operating on a networked client computer which has previously been loaded with an appropriate form. In other embodiments, the consumer may be operating over a telephone or other telecommunications device. In some but not all embodiments, this benefits wizard may be located on a remote server, and the information from the user (112) to the server holding the benefits wizard (118) may travel over a network such as the internet.

The user input may consist of the costs of treatment that the consumer expects or is willing to pay for certain medical conditions. The benefits wizard uses information from the insurance databases (114) and typical medical costs database (116) to evaluate the consumer's request and provide a report (120) to the user. This report will often contain a list of suitable insurance policies and their coverage benefits. As previously discussed, the list of insurance policies can be sorted in various ways to make it easier for the consumer to identify desirable insurance policies more quickly. For example, the list could be sorted in increasing order of "out-of-pocket" expenses.

The benefits (118) estimator can perform a variety of different calculations, some of which will be discussed in more detail shortly.

As a simple example, consider an insurance policy that will cover 80% of the first $2500 in medical costs, 90% of medical costs between $2500 and $5000, and 100% of medical costs above $5000. While using the benefits wizard tool, if the consumer expects the total medical cost to be $3000, the system will calculate the results as follows:

Insurance will pay 80% of $2500+90% of ($3000−$2500)

=$2000+$450

=$2450

Out-of-pocket expenses=$3000−$2450

=$550

These results can then be presented to the user and/or used to for rank comparisons of the various insurance plans.

Figure 2:
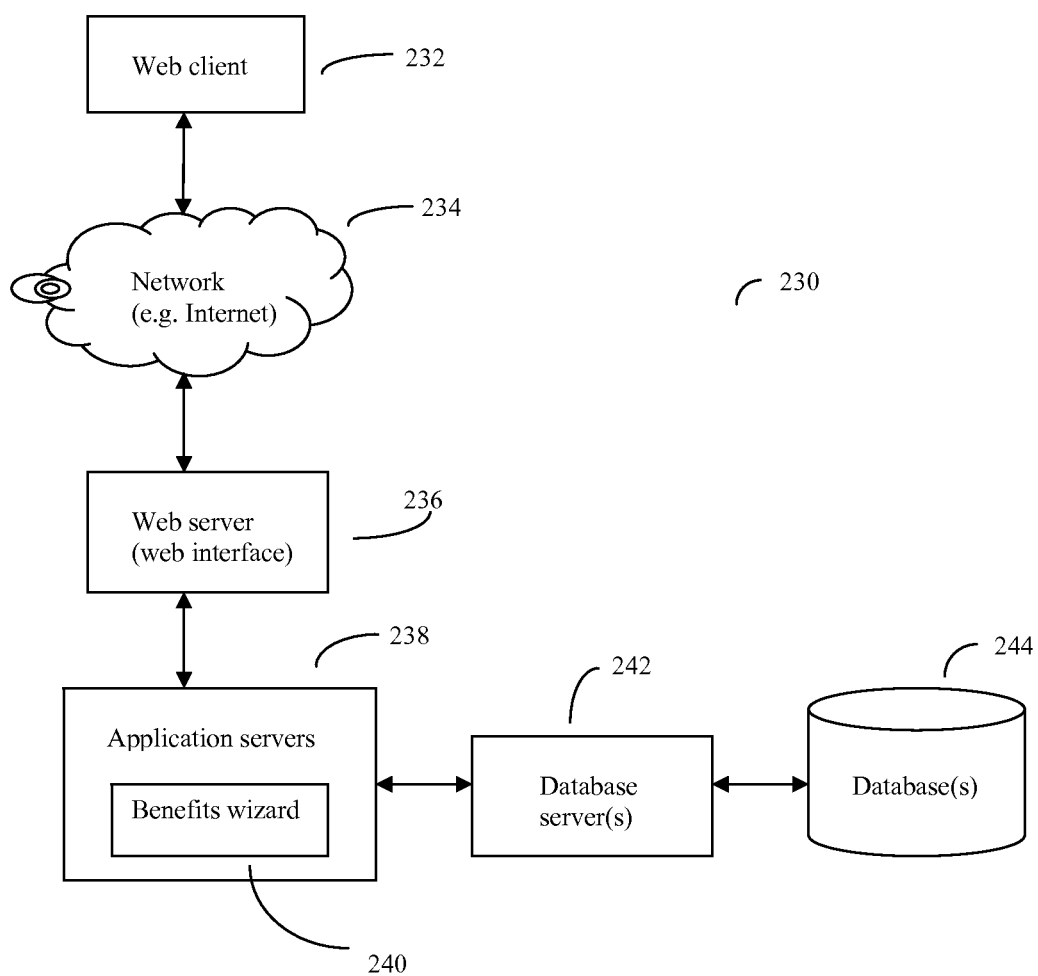
FIG. 2 shows an overview of the data flow between the application servers, the database servers, and the web client.

FIG. 2 illustrates a specific scenario where the benefit wizard tool is used on a system (230) with a client-server architecture where a web client (232) (e.g. a web browser such as the Internet Explorer, a web enabled "app", or other internet connected client software) communicates with a web server (236) and application servers (238) that host the benefits wizard application (240). The application servers are coupled to one or more database servers (242) that facilitate access to one or more databases (244). The benefits wizard provides its service to multiple clients via a network (234) (e.g. the Internet). Note that here, the web server (236) will usually send the form to the user's client or web client (232), and will also receive data from the user that is transmitted back across the internet (234) from the web client (232).

Figure 3:
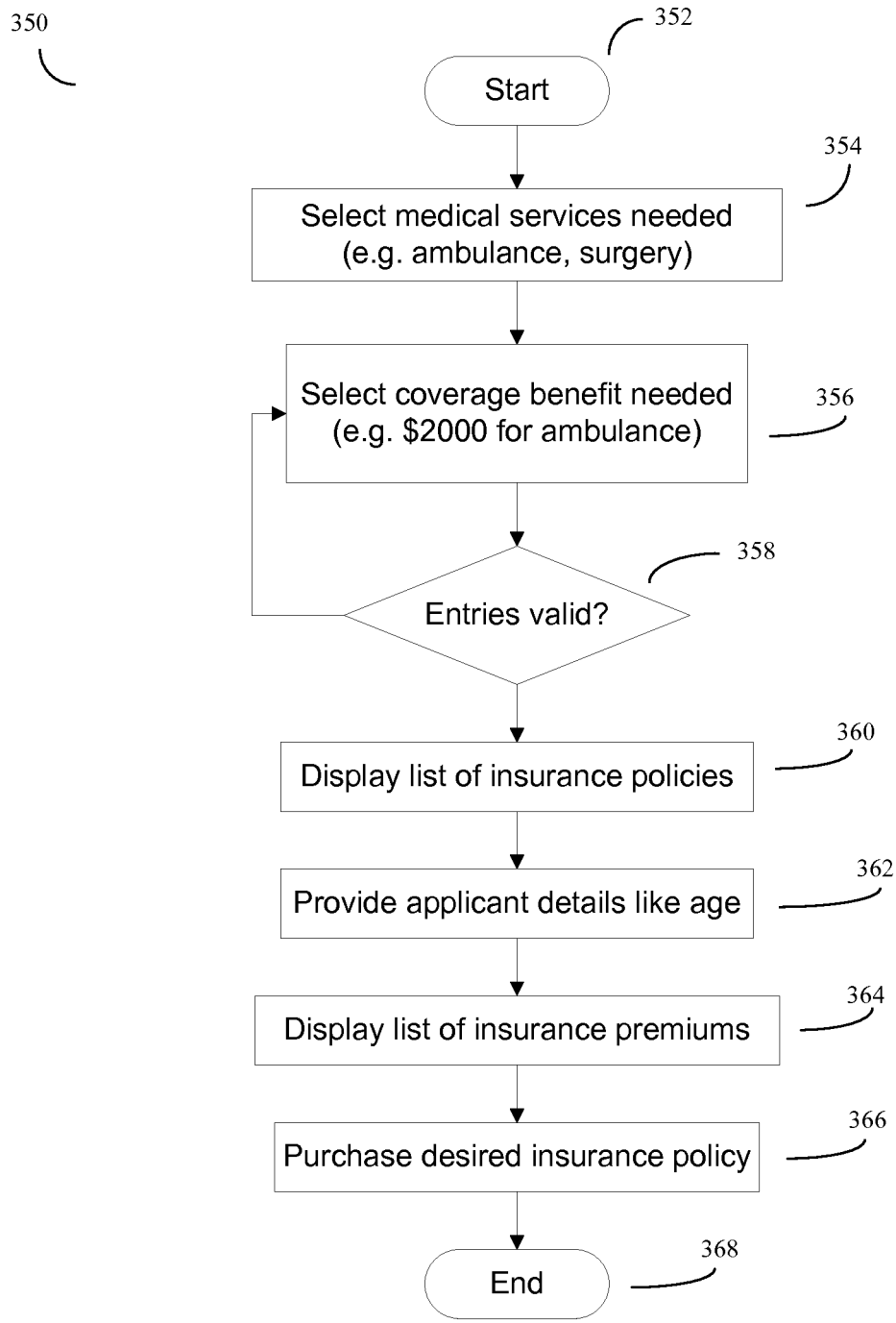
FIG. 3 shows a sequence of steps that may be performed by the user (customer) on the user's client device (client) as the user enters information into the user input form.

FIG. 3 shows a flowchart (350) that illustrates a sequence of steps that may, in some embodiments, be performed by a consumer as the consumer interacts with the benefits wizard application to find a suitable insurance policy. At block (354), the consumer may select the medical services (e.g. ambulance, surgery) that the consumer thinks he/she might need, and for which the consumer desires coverage. At block (356), the consumer may select the costs the consumer expects or is willing to pay for the services selected at block (354). In alternative embodiments, at block (356), the system itself may provide the typical or more worst-case results for the countries or regions where the customer intends to travel or reside. That is, to aid the consumer in selecting appropriate costs for the services, the consumer is presented with a range of costs associated with each service. The consumer should be aware (or the system can inform the user) that the costs of these services could be affected by geographical factors (e.g. cost of ambulance will vary based on the city in which the consumer resides), the choice of hospital, etc. In a preferred embodiment, the system will have a database of these typical costs, as well as the spread in these costs for the particular geographic area in question, and will supply these results to the user automatically.

At block (358), the system validates the consumer's entries, e.g. if the consumer entered $10 coverage for ambulance service, the system reports an error because no insurance policy will provide $10 coverage for ambulance. Alternatively, the system can simply present average or worst case medical costs for this service, and not allow the user to enter in a value below this amount.

After successfully validating the consumer's entries, at block (360), the system will generate a list of insurance policies that provide the coverage desired by the consumer. The list will display, for each insurance policy, the charges that the insurance policy will pay, along with the "out-of-pocket" expenses that the consumer will have to pay. This list may be sorted in order of increasing "out-of-pocket" expenses so the consumer can quickly identify the policies that will provide the maximum benefit. The system can also optionally generate appropriate links to "buy now", "request more information", "bookmark", "add to favorites", or "add to shopping cart" options during this step.

At block (362), the applicant can enter his or her risk parameters (medical parameters) information (such as the applicant's age, sex, etc). (Note that in some embodiments, block (362) may be positioned before block (360), so that no list of policies is provided until the user enters in his or her medical parameters). The applicant will then be able to see the list of insurance premiums for each insurance policy (block 364). At block (366), the consumer can then proceed to purchase the policy by clicking on a "Buy Now" or equivalent button, or request more information, or bookmark the policy, or add the policy to list of favorites, or place the policy in a shopping cart for later purchase.

Some more examples of the various algorithms that may be used by the insurance benefits estimator (benefits wizard) are shown below:

Consider a patient who uses the following medical services in the order shown:
X-rays
Hospitalization
Surgery Assume the cost of the medical services to be as follows:
X-rays: $500
Hospitalization: $7,000
Surgery: $25,000
Total Cost: $32,500

Now consider an insurance plan (insurance plan 1) that provides coverage as follows:
Insurance Plan 1:
80% coverage up to $2,500
90% coverage to $10,000
100% coverage beyond $10,000

This scenario is shown in FIG. 4. To calculate the benefits that the patient will receive, the system software may set a pointer (400) to the beginning of the coverage scale shown above, and begin to move the pointer to the right (402), (404), (406) as it applies the coverage benefits to the medical services used by the patient.

X-ray (402):
The first $500 will be covered up to 80%, so the insurance will pay 80% of 500=$400.

Hospitalization (404):
The first $2,000 of hospitalization will be covered at 80% and the remaining $7,000−$2,000=$5,000 will be covered at 90%. This means insurance will pay (80% of 2000)+(90% of 5000)=$6,100.

Surgery (406):
The first $2,500 of surgery will be covered at 90% and the remaining $25,000−$2,500=$22,500 will be covered at 100%. This means insurance will pay (90% of 2500)+(100% of 22,500)=$24,750.

This results in the following insurance coverage information and out-of-pocket expenses for this patient are shown in table 1 below:

TABLE 1

| Medical Service | Hospital Bill | Insurance Pays | Patient's Responsibility |
| --- | --- | --- | --- |
| X-ray | $500 | $400 | $100 |
| Hospitalization | $7,000 | $6,100 | $900 |
| Surgery | $25,000 | $24,750 | $250 |
| TOTAL | $32,500 | $31,250 | $1,250 |

Often the user (who will anticipate that he or she may be the patient in question) may be most interested in knowing his or her total out-of-pocket expense ($1250), which is indicated in the lower right hand corner above.

The system may rapidly do this type of analysis over a variety of different insurance plans. For example, consider a situation where the system then compares this scenario with a different insurance plan (insurance plan 2) with different coverage rules, as follows:
Insurance Plan 2:
100% coverage up to $2,500
90% coverage to $10,000
80% coverage beyond $10,000

Assuming the same hospital bill as above:

X-ray:

The first $500 will be covered up to 100%, so the insurance will pay 100% of 500=$500.

Hospitalization:

The first $2,000 of hospitalization will be covered at 100% and the remaining $7,000−$2,000=$5,000 will be covered at 90%. This means insurance will pay (100% of 2000)+(90% of 5000)=$6,500.

Surgery:

The first $2,500 of surgery will be covered at 90% and the remaining $25,000−$2,500=$22,500 will be covered at 80%. This means insurance will pay (90% of 2500)+(80% of 22,500)=$20,250.

This results in the following insurance coverage information and out-of-pocket expenses for the user (the potential patient), which is shown in table 2 below:

TABLE 2

| Medical Service | Hospital Bill | Insurance Pays | Patient's Responsibility |
| --- | --- | --- | --- |
| X-ray | $500 | $500 | $0 |
| Hospitalization | $7,000 | $6,500 | $500 |
| Surgery | $25,000 | $20,250 | $4,750 |
| TOTAL | $32,500 | $27,250 | $5,250 |

The patient's total out-of-pocket expense in this case will be $5,250, again shown in the lower right hand corner of table 2.

The system will often perform these calculations for all available suitable medical insurance plans, and display the results to the user, often sorted in order, such as most benefits (least patient responsibility) first.

These examples illustrate that depending on the patient's expected medical needs, the patient can determine which insurance plan he would like to purchase with the full knowledge of the out-of-pocket expenses that the patient will incur should he use the medical services while the insurance is active.

In the above case, if the patient expects to use expensive medical services, then the patient is better off purchasing the first insurance policy, because the coverage for the insurance policy increases as the hospital bill increases. However, for simple medical situations that cost only a few hundred or few thousand dollars, often the second insurance plan may be a cheaper option. In some embodiments, the system will display prices as well as benefits, and also include information such as price/benefit or benefit/price ratios to help guide decision making. The system may optionally sort the results in different orders, such as by price/benefit or benefit/price ratios or even some hybrid such as minimum benefit sorting as a primary key and benefit/price as a secondary sorting key, and so on.

Having discussed how the algorithms behind the benefits estimator (benefits wizard) work, let us now turn to a discussion of some example user interfaces for the invention. In this example, these user interfaces will typically be uploaded from a server to a client, such as a personal computer, used by the user. FIGS. 5 though 9 show various screenshots of one embodiment of the invention, here running within a typical web browser screen.

FIG. 5 (500) shows an example of a user input form, typically running in the web browser or other web enabled client software of a client device, which can capture both some of the user travel parameters and medical parameters on the same screen. In other configurations, the user travel parameters and medical parameters may be captured over multiple screens. Indeed in general, just as a paper medical form may consist of many paper pages, any of the client data may be entered on any combination of screens or web pages.

In this example, an individual from outside the US (for example from India) wishes to purchase travel insurance to the US. The applicant can enter in the country where travel medical insurance is desired in box (502), and the applicant's age in (504). This same form can also collect other parameters such as spousal coverage (506), dependent children coverage (508), and coverage period (510).

FIG. 6 shows an example of a user input form, again typically running on the web browser or other app (application software) of a client device, which can start to capture some of the various medical scenario parameters (600). In this example, the user has checked essentially every scenario available for both the simple medical situations (602) and the complex medical situations (604). This form also gives an alternate location in which the user may indicate the age of the applicant (606).

FIG. 7 shows an example of a user input form, again in this example running on the web browser of a client device, which can capture additional information on the various medical scenarios that the applicant (use) wishes to insure against (700). In this example, the system has pre-populated the form (702) with the average medical costs for the particular product or service in the geographical area in which the applicant is traveling (here the US, and the applicant previously told the system that he or she were traveling from outside the US).

The applicant in turn can inform the system about what sort of scenarios the applicant will wish to protect against. For example, here the user has determined that in his or her view, the worst case scenario is two doctors' visits (704), three lab tests (706), one prescription drug (708), and two days stay in a hospital room (710).

Figure 8:
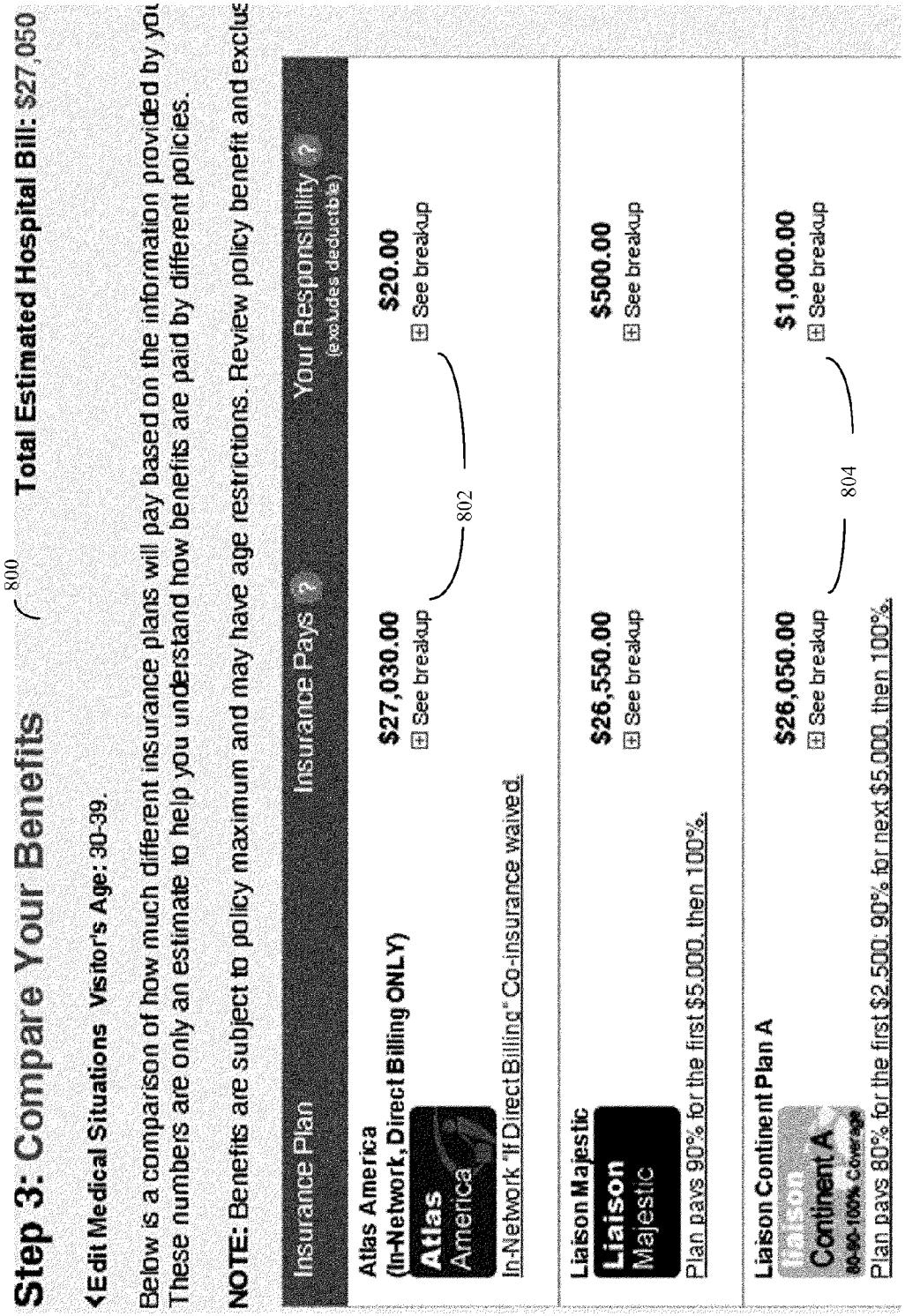
FIG. 8 shows an example of a ranked comparison result of the reimbursement benefits provided by various medical insurance plans, which has been transmitted to the client computer, and is now being viewed by the user in a web browser of a client.

FIG. 8 shows an example of a ranked comparison result of the reimbursement benefits provided by various medical insurance plans which has been transmitted to the client computer and is now being viewed by the user (800). Here the various insurance plans are being ranked in order of best benefits (least user responsibility) first (802) to lesser benefits (more user responsibility) (804) last. The full list may extend far below the small section of the screen that can be shown in this illustration.

In alternative embodiments (not shown) a "buy it" button or "more information" or "add to shopping cart" link can be added to each insurance plan to facilitate user purchase or ability to obtain more information about plans of interest. In other alternative plans, the cost per plan can be displayed in an extra column (not shown). Alternatively the user may choose to sort the plans in alternate order, such as cheapest to most expensive. In still other alternatives, the user can ask the system to calculate what plan(s) deliver the most benefits per unit cost, and sort the plans in a cost effectiveness order, or otherwise highlight those plans that are most cost effective.

In FIG. 9 a more detailed breakdown result (analysis) of the reimbursement benefit provided by a specific medical insurance plan against a specific user scenario has been transmitted to the client computer and is now being viewed by the user. Here the results from the medical scenario previously entered by the user can be seen at a glance (900).

As previously discussed, although most of the examples in this disclosure have focused on the specific areas of medical insurance, and in particular short or long duration travel or foreign residence medical insurance, the methods discussed herein can, in fact, be applied to many other types of insurance as well. This includes, but is not limited to, auto insurance, travel insurance, health insurance, medical insurance, life insurance, flood insurance, fire insurance, earthquake insurance, renter's insurance, and liability insurance.

The invention claimed is:

1. A method of making comparisons between a plurality of different medical insurance plans over a network, said method comprising:
   entering information on a plurality of cost parameters and reimbursement parameters of a plurality of different medical insurance plans into a computer database;
   constructing at least one user input form capable of capturing a plurality of medical parameters and scenario parameters and transmitting said user input form to at least one client;
   using said at least one user input form to capture said plurality of medical parameters and scenario parameters on said client;
   transmitting said plurality of medical parameters and scenario parameters to a server;
   using at least one algorithm to retrieve said cost parameters and reimbursement parameters of a plurality of different medical insurance plans from said computer database, and producing a ranked comparison result of the cost of, and reimbursement benefits provided by, said plurality of different medical insurance plans as a function of said cost parameters and reimbursement parameters, and said plurality of medical parameters and scenario parameters;
   and transmitting said ranked comparison results to said at least one client;
   in which said plurality of different medical insurance plans is a plurality of different short or long duration travel or foreign stay medical insurance plans for at least one country.

2. The method of claim 1, in which said method uses an internet server and web browser or other internet enabled client software running on a client device (client).

3. The method of claim 1, in which said scenario parameters may be rearranged by a user using said at least one user input form into alternate orders of events, so that the same scenario parameters may be evaluated according to alternate orders of scenario events.

4. The method of claim 1, in which said at least one user input form is additionally capable of capturing a plurality of travel parameters, a plurality of travel parameters are returned to said server over said network, said at least one algorithm additionally compares said plurality of travel parameters across said plurality of different medical insurance plans.

5. The method of claim 1, wherein said cost parameters comprise a plurality of parameters, at least some of said parameters being parameters selected from the group consisting of costs of doctors visits, costs of lab tests, costs of x-rays, cost of prescription drugs, cost of a hospital room on a per day basis, costs of surgery, costs of intensive care, costs of an ambulance, costs of anesthesia, costs of dental treatments, and costs of eye treatments.

6. A method of making comparisons between a plurality of different short or long duration travel or foreign stay medical insurance plans for at least one country over a network, said method comprising:
   entering information on a plurality of cost parameters and reimbursement parameters of a plurality of said medical insurance plans into a computer database connected to a networked server;
   constructing at least one user input form capable of capturing a plurality of travel parameters, medical parameters, and scenario parameters and transmitting said user input form to at least one client;
   using said at least one user input form to capture said plurality of travel parameters, medical parameters, and scenario parameters on said client;
   transmitting said plurality of travel parameters, medical parameters, and scenario parameters to said server;
   using at least one algorithm to retrieve said cost parameters and reimbursement parameters of a plurality of different medical insurance plans from said computer database, and producing a ranked comparison result of the cost of, and reimbursement benefits provided by, said plurality of different medical insurance plans as a function of said cost parameters and reimbursement parameters, and said plurality of travel parameters, medical parameters, and scenario parameters;
   and transmitting said ranked comparison results to said at least one client;
   in which said plurality of travel parameters comprise at least one parameter selected from the group consisting of a country of travel origin, user residence, or user citizenship, and at least one country in which at least some of said plurality of short or long duration travel or foreign stay medical insurance plans are operative.

7. The method of claim 6, in which said database contains said cost parameters and said reimbursement parameters of said at least one country in which said at least some of said plurality of medical insurance plans are operative.

8. The method of claim 6, in which said plurality of travel parameters additionally comprises regions of travel within regions of at least one country in which at least some of said plurality of medical insurance plans are operative; and
   said database additionally comprises said cost parameters and reimbursement parameters of regions of said at least one country in which at least some of said plurality of medical insurance plans are operative.

9. The method of claim 6, in which said medical parameters comprise at least one parameter selected from the group consisting of applicant age, sex, applicant nationality, deductible, maximum coverage, spouse age, spouse sex, spouse coverage, dependent children ages, dependent children sexes, and dependent children ages.

10. The method of claim 6, wherein said cost parameters comprise a plurality of parameters, at least some of said parameters being parameters selected from the group consisting of costs of doctors visits, costs of lab tests, costs of x-rays, cost of prescription drugs, cost of a hospital room on a per day basis, costs of surgery, costs of intensive care, costs of an ambulance, costs of anesthesia, costs of dental treatments, and costs of eye treatments.

11. The method of claim 6, in which said scenario parameters comprise at least one parameter selected from the group consisting of simple medical situations, complex medical situations, and percent of medical costs covered for the selected medical situations.

12. The method of claim 11, in which said simple medical situations comprise at least one situation selected from the group consisting of doctors visits, doctors consultations, lab tests and exams, X-rays, and prescription drugs.

13. The method of claim 12, in which said scenario includes at least one scenario selected from the group consisting of number of doctor's visits, number of doctor's consultations, number of lab tests and exams, number of X-rays, and number of prescription drugs.

14. The method of claim 11, in which said complex medical situations comprise at least one situation selected from the group consisting of hospital room costs, surgery, intensive care, urgent care, emergency services, therapy, anesthesia, dental treatments, eye treatments, pre-existing medical conditions, ambulance, death, dismemberment, and evacuation costs.

15. The method of claim 14, in which said scenario comprises at least one scenario selected from the group consisting of number of hospital room days, surgery incidents, intensive care days, urgent care incidents, emergency services, therapy sessions, anesthesia, dental treatments, eye treatments, pre-existing medical conditions, ambulance incidents, accidental death, accidental dismemberment, and evacuation.

16. The method of claim 11, in which a desired said percent of medical costs covered can be selected individually for said medical situations or as whole, and in which said ranked comparison results are filtered based upon said percent of medical costs selected.

17. The method of claim 6, in which said ranked comparison results are ranked according to highest benefits first, lowest cost second; or lowest cost first, highest benefits second; or according to a user-selected option.

18. The method of claim 6, in which an option to purchase said insurance is provided with said ranked comparison results and displayed on said at least one client.

19. A method of making comparisons between a plurality of different short or long duration travel or foreign stay medical insurance plans for at least one country using a network, said method comprising:
   entering information on a plurality of cost parameters and reimbursement parameters of a plurality said medical insurance plans into a computer database connected to a networked server;
   constructing at least one user input form capable of capturing a plurality of travel parameters or foreign stay, medical parameters, and scenario parameters and transmitting said at least one user input form to at least one client;
   wherein said plurality of travel parameters comprise at least one parameter selected from the group consisting of a country of travel origin, user residence, or user citizenship, coverage geographical area, departure date, return date, coverage start date, coverage end date, and said at least one country in which at least some of said plurality of said medical insurance plans are operative;
   wherein said medical parameters comprise at least one parameter selected from the group consisting of applicant age, applicant sex, applicant nationality, deductible, maximum coverage, spouse age, spouse sex, spouse coverage, dependent children ages, dependent children sexes, and dependent children coverage;
   using said at least one user input form to capture said plurality of travel parameters, medical parameters, and scenario parameters on said client;
   transmitting said plurality of travel parameters, medical parameters, and scenario parameters to said server;
   using at least one algorithm to retrieve said cost parameters and reimbursement parameters of a plurality of different medical insurance plans from said computer database, and producing a ranked comparison result of the total cost of, and reimbursement benefits provided by, said plurality of different medical insurance plans as a function of said cost parameters and reimbursement parameters, and said plurality of travel parameters, medical parameters, and scenario parameters;
   in which said ranked comparison results are ranked according to highest benefits first, lowest cost second; or lowest cost first, highest benefits second; or according to a user-selected option;
   and transmitting said ranked comparison results to said at least one client.

20. The method of claim 19, wherein said scenario parameters comprise at least one parameter selected from the group consisting of simple medical situations, complex medical situations, and percent of medical costs covered,
   wherein said simple medical situations comprise at least one scenario selected from the group consisting of number of doctors visits, number of doctor's consultations, number of lab tests and exams, number of X-rays, prescription drug coverage, and number of prescription drugs; and
   wherein said complex medical situations comprise at least one scenario selected from the group consisting of number of hospital room days, surgery incidents, intensive care days, urgent care incidents, emergency services, therapy sessions, anesthesia, dental coverage, dental treatments, eye treatments, pre-existing medical conditions, ambulance incidents, accidental death, accidental dismemberment, and evacuation.

21. The method of claim 19, in which said plurality of travel parameters additionally comprises regions of travel within regions of at least one country in which at least some of said plurality of medical insurance plans are operative; and
   said database contains additionally comprises said cost parameters and the reimbursement parameters of regions of said at least one country in which at least some of said plurality of medical insurance plans are operative.

22. The method of claim 19, wherein an option to purchase said insurance is provided with said ranked comparison results and displayed on said at least one client.

* * * * *